Jan. 31, 1956 — R. HEIDECKE ET AL — 2,732,751
MOUNTING RING FOR CAMERA ACCESSORIES
Filed March 6, 1953 — 2 Sheets-Sheet 1

REINHOLD HEIDECKE
HERMANN BRETTHAUER
INVENTORS

BY Charles Shepard
ATTORNEY

Jan. 31, 1956  R. HEIDECKE ET AL  2,732,751
MOUNTING RING FOR CAMERA ACCESSORIES
Filed March 6, 1953  2 Sheets-Sheet 2

REINHOLD HEIDECKE
HERMANN BRETTHAUER
INVENTORS

BY Charles Shepard

ATTORNEY

United States Patent Office 2,732,751
Patented Jan. 31, 1956

2,732,751

MOUNTING RING FOR CAMERA ACCESSORIES

Reinhold Heidecke and Hermann Bretthauer, Braunschweig, Germany, assignors to Franke & Heidecke, Fabrik Photographischer Prazisions-Apparate, Braunschweig, Germany, a German firm Application March 6, 1953, Serial No. 340,874

Claims priority, application Germany March 8, 1952

5 Claims. (Cl. 88—1)

This invention relates to a supplementary ring attachment adapted to be mounted on the photographic lens or finder lens of a photographic camera, which ring may have certain accessories mounted thereon, such as auxiliary lenses, ray filters or flash lamps. It is one of the objects of this invention to provide a ring of this kind which may be quickly mounted on a camera lens by means of interengaging parts on the supplementary ring and the lens mount, which is attractive in appearance, simple in construction, inexpensive to make, and taking up a minimum of space in both radial and axial directions.

Another object of the invention is the provision of a ring of this kind which can be securely mounted on the lens mounting in any position circumferentially of the lens for the purpose of properly mounting optical prisms, wedges, polarizing filters, and the like, in proper cooperating position with the camera lens or the finder lens, as the case may be.

Still another object of the invention is the provision of a supplementary lens ring of this kind which may be quickly attached or detached from the usual bayonet lugs on the lens mounting, means being provided for securing the ring on the lens mounting in any adjusted position circumferentially of the lens.

A further object of the invention is the provision of means for clamping the supplemental ring on the lens in positions intermediate the positions assumed when the bayonet joints are fully engaged, such clamping being resilient so that the ring may be disengaged without damaging the bayonet parts or the clamping means even if one accidentally fails to release the clamping means before attempting to remove the supplemental ring.

A supplementary lens ring according to the present invention is especially desirable for use in cameras of the twin lens reflex type, which have a view-finder chamber and lens mounted above the exposure chamber. In these cameras, a flash lamp mounted on the finder lens, for example, must be so mounted as to avoid interference with either the viewing hood or the direct view finder when the camera is operated to take pictures with one or the other of these two finders, and this often requires the positioning of the flashlight supporting arm in an intermediate angular position rather than in the end position or extreme limit position established when the bayonet lugs are fully engaged.

These and other desirable objects may be attained in the manner disclosed as an illustrative embodiment of the invention in the following description and in the accompanying drawings forming a part hereof, in which.

The same reference numerals throughout the several views indicate the same parts.

Figure 1:
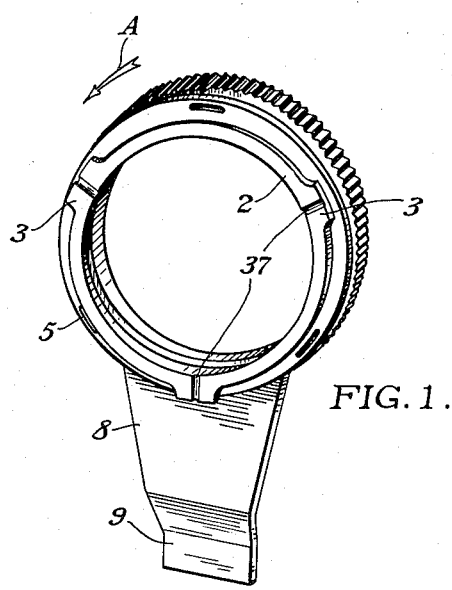
Fig. 1 is a perspective view of a supplemental mounting ring constructed according to one possible embodiment of the invention showing the rear side of the ring.
Figure 2:
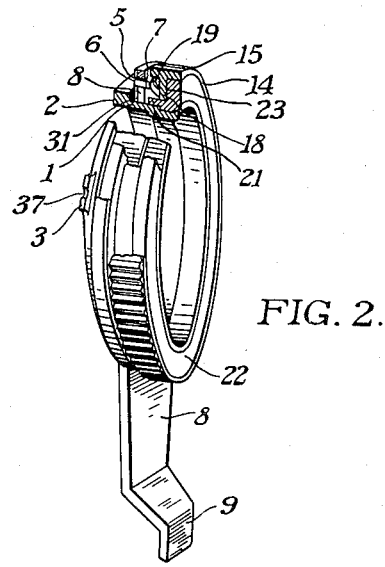
Fig. 2 is a similar view, partly in section showing the front side of the ring.
Figure 3:
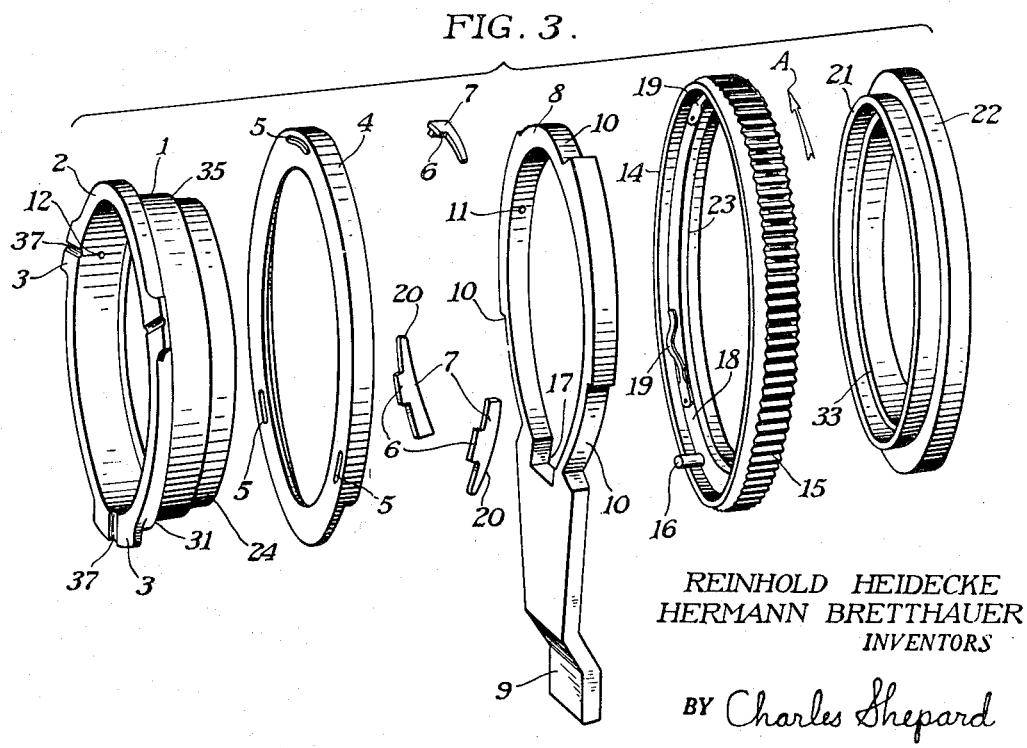
Fig. 3 is an exploded or disassembled perspective view of the parts of the ring.

The supplemental ring or mounting ring illustrated in Figs. 1 to 4 of the drawings comprises a base or bayonet ring 1 having a plurality of radially projecting bayonet lugs 3 on a thickened rear part 2 of the ring 1. Three of these lugs 3 are shown in the drawings, although a greater or lesser number may be found desirable in some cases. These projections or lugs are adapted to engage bayonet slots provided therefor on the mounting of either the picture-taking lens or the finder lens of a photographic camera, in a well known manner. A flanged ring 4 is mounted on the ring 1 against an external shoulder 31 thereof, and has a plurality of slots or openings 5 formed in its inwardly projecting flange. Three of these slots 5 are shown in the drawings, arranged circumferentially midway between the bayonet lugs 3.

Dogs or cam shaped members 7 having lugs 6 are mounted on the slotted ring 4 with the lugs 6 projecting rearwardly through the slots 5 and having a base portion arranged to engage the front wall of the radial flange of the ring 4 to limit the rearward movement of the lugs. Mounted on the base ring 1 forwardly of the flanged ring and in contact with said flanged ring is a carrier ring 8 having a projecting arm 9 on which an accessory, such as a flash lamp, may be mounted. The carrier ring is provided with circumferential recesses 10 in which the dogs 6 are arranged. The ring 8 is seated against a radial flange on the ring 4 which also has a forwardly projecting flange which has a cut out portion in which the arm 9 is seated, so that the flanged ring 4 is fixed against rotation relatively to the ring 8, and the ring 8 is itself fixed against rotation relatively to the bayonet ring 1, 2 by means of a pin or screw 13 arranged in aligned openings 11 and 12 provided in the carrier ring and bayonet ring respectively.

An operating ring 14 is mounted in front of the flanged ring 4 and has a knurled periphery 15 whereby it may be manually operated. A projection, shown in the form of a pin 16, extends rearwardly from the ring 14 into a slot 17 provided therefor in the carrier ring 8, which limits the rotation of the operating ring in opposite directions. The ring 14 has an internal collar or flange 18 integral therewith, from which the pin 16 projects rearwardly. Also secured to this collar or flange 18, by any suitable or preferred means, as by rivets, are a plurality of resilient cams 19 shown in the form of leaf springs. The cams 19 engage the inclined or oblique cam faces 20 formed on the front edges of the dogs 7.

The above described parts are secured in assembled position by means of a front retaining ring having a rearwardly projecting flange 21 and a circumferential collar 22. The front ring is seated in the operating ring 14 and its collar 22 engages a collar or shoulder 23 in said operating ring. The forwardly projecting cylindrical flange 24 on the base ring 1 projects slightly forward of the front ring 21, 22 and is bent or flanged outwardly into engagement with the front face of the front ring, whereby the various assembled parts are mounted on and secured to the base or bayonet ring. A shoulder 33 on the ring 21 engages a shoulder 35 on the main ring 1, to determine the axial position of the ring 21 on the main ring, to avoid too great axial pressure on the rotary operating ring 14, 15, which might interfere with easy turning thereof.

The operation is as follows: The assembled bayonet ring with the desired accessory, such as a flash lamp mounted on the arm 9, is seated on a lens ring of a camera by engaging the bayonet slots on the lens ring. The assembled ring is then turned to the desired position, either to full extent when the lugs engage the ends of the bayonet slots, or to any position short of the full extent of the movement. The ring 14 is then turned manually in a clockwise direction (when viewed from the front of the camera) as indicated by the arrow A in the drawings, which causes the resilient cams 19 to ride along the oblique cam surfaces 20 of the dogs 7, and project the dogs resiliently rearwardly into engagement with the lens ring, to draw the lugs 3 forwardly into frictional engagement with the outer walls of the bayonet slots to secure the ring on the lens ring of the camera.

The leaf springs 19 have been referred to as cams. However, they may also be appropriately called cam operating members, since they are the members which, in moving to different positions along the inclined faces 20 of the cams 7, cause these cams 7 to move in an axial direction relative to the various rings.

The ears 3 for engaging in the bayonet slots of the camera are preferably provided on their rear faces with radial grooves 37, which engage with spring pressed balls or other spring pressed detents on the camera, when the ring is turned to certain positions, to hold the ring against accidental turning to a released position where the auxiliary ring might fall off the camera. But with the present clamping means, it is not necessary to turn the auxiliary ring until the detents on the camera engage the slots or grooves 37, because the clamping means of the present invention will adequately hold the auxiliary ring in any desired angular position of orientation, without having to rely upon the engagement of the camera detents with the grooves 37.

Figure 5:
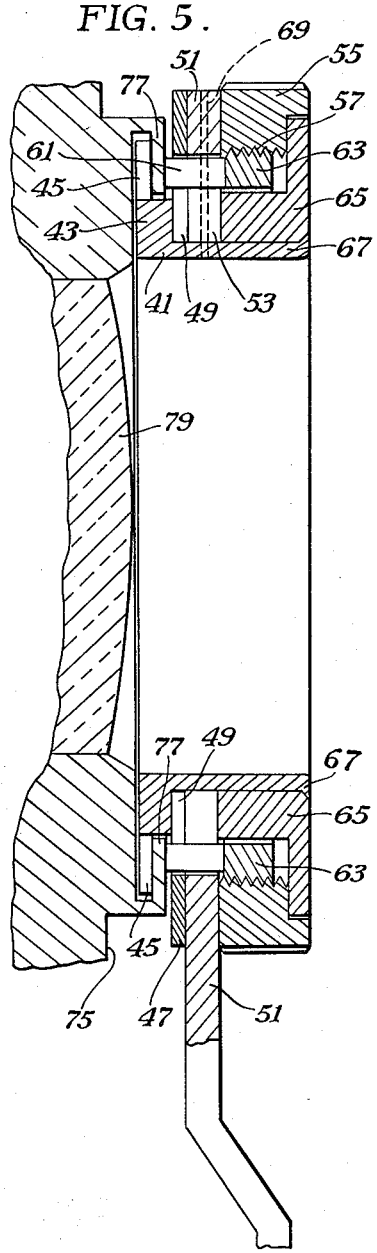
Fig. 5 is a similar radial section through a modified construction.

Referring now to the alternative construction shown in Fig. 5, this comprises the main ring 41 having a thick radial flange 43 at its inner or rear end, from which flange 43 the radial lugs 45 project, to engage with the bayonet slots on the camera. An annular ring 47 is mounted on the ring 41 in front of and against the front face of the flange 43, and at intervals around the ring 47 there are slots 49 therein, corresponding in number to the number of clamping shoes or brake shoes which are to be employed. Usually there are three clamping shoes, and three of the radial lugs 45.

Next in front of the ring 47 is the ring 51, corresponding in general to the ring 8 of the previous embodiment, and having a radial arm like the arm 9 in the previous embodiment, for holding the flashlight gun or other accessory which is to be mounted on this structure. The ring 51 is notched at 53, opposite the notches 49 of the ring 47.

Next in front of the member 51 is the operating ring 55, corresponding in general to the operating ring 14 of the previous embodiment, and having its outer peripheral surface knurled, like the knurling 15 in the previous embodiment. This ring 55 is of simpler construction than in the previous embodiment, however, and instead of being provided with resilient cam operating members like the members 19 of the previous embodiment, this ring 55 is simply provided with an internal screw thread 57, preferably a left hand thread.

Clamping is effected by the clamping shoes or brake shoes 61 integral with and projecting axially from the main body of a ring 63, having an external screw thread which mates with the thread 57 on the operating ring 55. The shoes 61 project through the slots 49 and 53 in the members 47 and 51, respectively. A ring 65 lies in front of a shoulder on the operating ring 55 and retains the latter snugly in place against the member 51, but with enough freedom so that the ring 55 may be easily turned. This final ring 65 is retained in place by expanding the portion 67 of the main ring 41 so as to engage with the ring 65 and prevent axial forward movement thereof, in a manner similar to the way in which the ring 1 of the previous embodiment is expanded at 24 to retain the ring 21. A radial pin 69, like the pin in the holes 11 and 12 previously described, passes through alined radial holes in the members 41 and 51, keeping them from turning relative to each other.

Assuming now that the threads on the members 55 and 63 are, as preferred, left hand threads rather than right hand threads, it is seen that when the operating ring 55 is turned rightwardly or in a clockwise direction (when viewed from the front) the action of the screw threads will move the ring 63 rearwardly, so that the shoes 61 will project rearwardly beyond the rear face of the ring 47, to bear firmly against the fixed parts of the camera and prevent the lugs 45 from moving circumferentially in the bayonet slots with which they are engaged. When the operating ring 55 is turned leftwardly or in a counterclockwise direction, the screw threads move the ring 63 axially forwardly, releasing the shoes 61 from contact with the fixed parts of the camera, so that the mechanism may now be turned easily to release the lugs 45 from the bayonet slots on the camera.

This second form of construction is somewhat simpler than the first form previously described with reference to Figs. 1–4. The second form does not have the advantage of the resilient action obtained by the leaf springs 19 of the first embodiment, but in many cases this resilient action is not necessary and a firm clamping by unyielding brake shoes or clamping shoes is all that is required.

Also, in this second form, the pin 16 and notch 17 of the previous embodiment may be omitted, for the extent of axial movement of the clamping ring 63 may be limited or determined by direct engagement of the ring 63 with the rings 51 and 65, respectively. When the ring 63 engages one or the other of these members, the operating ring 55 can turn no further.

Although screw threads are not usually spoken of as cams, yet actually screw threads do constitute inclined members functioning like cams, and may be described broadly as cams, for purposes of this present application.

Figure 4:
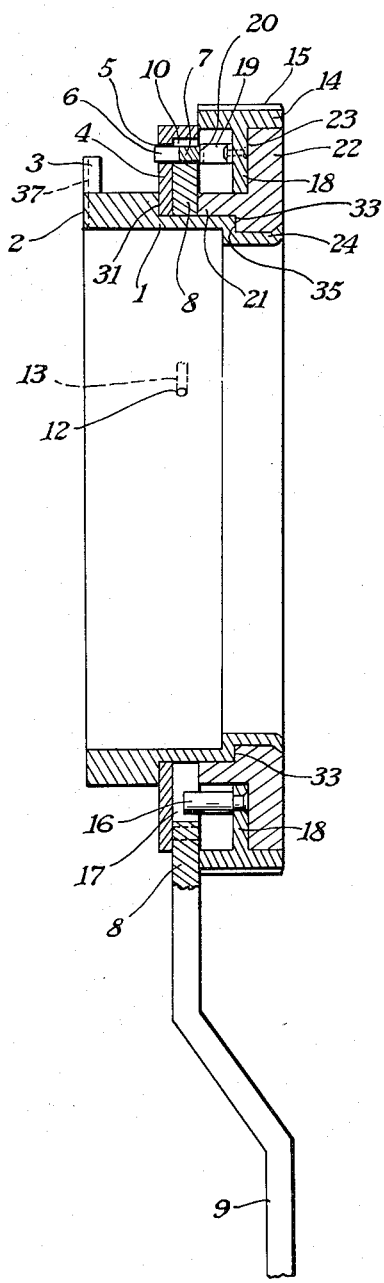
Fig. 4 is a radial section through the ring, on a larger scale.

A portion of the camera body is indicated diagrammatically at 75 in Figs. 4 and 5, and the front wall of the bayonet slot structure at 77, and the lens at 79.

It is seen from the foregoing disclosure that the above-mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. An accessory mount for a photographic camera of the type having a lens and a ring provided with a plurality of bayonet flanges surrounding said lens, said mount comprising a first ring-shaped member having a plurality of radially outwardly extending lugs adapted to mate with and engage behind said bayonet flanges to hold said ring-shaped member on said camera, said ring-shaped member having a central opening aligned with the camera lens when said member is mounted on said camera so that light may pass through said central opening toward said lens, a second ring-shaped member fixed to and surrounding a portion of said first ring-shaped member, said second member having an arm extending approximately radially to a substantial distance from said first member for mounting a camera accessory such as a flash lamp, a third ring-shaped member encircling and fixed to a portion of said first ring-shaped member and engaging said second ring-shaped member to assist in holding it in place on said first member, an actuating ring rotatable with respect to said first, second, and third members and having a portion engaged between said second and third members to hold said actuating ring against axial movement, screw threads on said actuating ring, a brake shoe ring having screw threads engaged with those of said actuating ring, said brake shoe ring being mounted for limited axial movement relative to said first, second, and third members and being restrained from rotary movement relative to them so that when said actuating ring is rotated the coaction of said screw threads on said actuating ring with those on said brake shoe ring will cause axial movement of said brake shoe ring relative to said first member, and a plurality of brake shoe portions on said brake shoe ring for engaging said bayonet flanges on said camera when said accessory mount is mounted on said camera and when said actuating ring is turned to move said brake shoe ring toward said bayonet flanges, thereby to clamp said accessory mount in non-rotatable relation to said bayonet flanges.

2. An accessory mount for a photographic camera of the type having a lens and a ring provided with a plurality of bayonet flanges surrounding said lens, said mount comprising a first ring-shaped member having a plurality of radially outwardly extending lugs adapted to mate with and engage behind said bayonet flanges to hold said ring-shaped member on said camera, said ring-shaped member having a central opening alined with the camera lens when said member is mounted on said camera so that light may pass through said central opening toward said lens, a second ring-shaped member fixed to and surrounding a portion of said first ring-shaped member, said second member having an arm extending approximately radially to a substantial distance from said first member for mounting a camera accessory such as a flash lamp, a third ring-shaped member encircling and fixed to a portion of said first ring-shaped member and engaging said second ring-shaped member to assist in holding it in place on said first member, an actuating ring rotatable with respect to said first, second, and third members and having a portion engaged between said second and third members to hold said actuating ring against axial movement, a plurality of brake shoes mounted for limited axial movement relative to said first, second, and third members and being restrained from rotary movement relative to them, and cooperating cam portions on said actuating ring and said brake shoes for moving said brake shoes axially relative to said first member when said actuating ring is turned relative to said first member, whereby when said accessory mount is mounted on said camera said actuating ring may be turned to move said brake shoes axially into contact with said bayonet flanges to clamp said accessory mount in non-rotatable relation to said bayonet flanges.

3. A construction as defined in claim 2, in which said cooperating cam portions on said actuating ring and said brake shoes are in the form of screw threads.

4. A construction as defined in claim 2, in which said cooperating cam portions on said actuating ring and said brake shoes are in the form of inclined surfaces on said brake shoes and resilient springs on said actuating ring for engaging with said inclined surfaces.

5. An accessory mount for a photographic camera of the type having a lens and a ring provided with a plurality of bayonet flanges surrounding said lens, said mount comprising a first ring-shaped member having a plurality of radially outwardly extending lugs adapted to mate with and engage behind said bayonet flanges to hold said ring-shaped member on said camera, said ring-shaped member having a central opening alined with the camera lens when said member is mounted on said camera so that light may pass through said central opening toward said lens, means connected to said first member for mounting an accessory intended to be used with said camera, an actuating ring supported from said first member and rotatable with respect to said first member and restrained from axial movement relative to said first member, a plurality of brake shoes mounted for limited axial movement relative to said first member and restrained from rotary movement relative to it, and cooperating cam portions on said actuating ring and said brake shoes for moving said brake shoes axially relative to said first member when said actuating ring is turned relative to said first member, whereby when said accessory mount is mounted on said camera said actuating ring may be turned to move said brake shoes axially into contact with said bayonet flanges to clamp said accessory mount in non-rotatable relation to said bayonet flanges.

References Cited in the file of this patent
UNITED STATES PATENTS

| | | |
|---|---|---|
| 808,446 | Gill et al. | Dec. 26, 1905 |
| 1,833,694 | Stant | Nov. 24, 1931 |
| 1,971,434 | Trautmann | Aug. 28, 1934 |
| 2,052,261 | Verschoor | Aug. 25, 1936 |
| 2,484,464 | Quigley et al. | Oct. 11, 1949 |
| 2,610,820 | Markel et al. | Sept. 16, 1952 |
| 2,616,584 | Rausenberger et al | Nov. 4, 1952 |